United States Patent [19]

Chang

[11] 4,000,213
[45] Dec. 28, 1976

[54] USE OF DIEPOXIDES IN POLYTHIODIETHANOL MILLABLE GUMS

[75] Inventor: Eugene Yue Chieh Chang, Bridgewater, N.J.

[73] Assignee: American Cyanamid Company, Stamford, Conn.

[22] Filed: Nov. 26, 1975

[21] Appl. No.: 635,520

Related U.S. Application Data

[63] Continuation-in-part of Ser. No. 534,544, Dec. 19, 1974, abandoned.

[52] U.S. Cl. .................. 260/830 S; 260/37 EP; 260/47 EP; 260/79
[51] Int. Cl.$^2$ ............... C08G 45/06; C08G 75/12
[58] Field of Search ............ 260/79, 47 EP, 830 R, 260/830 S

[56] References Cited

UNITED STATES PATENTS

| | | | |
|---|---|---|---|
| 2,830,031 | 4/1958 | Fisch | 260/830 R |
| 2,998,413 | 8/1961 | Holtschmidt et al. | 260/2.5 AP X |

OTHER PUBLICATIONS

Journal of Polymer Science (JPS) vol. XLI pp. 231–239 (1959).

*Primary Examiner*—Theodore E. Pertilla
*Attorney, Agent, or Firm*—William J. van Loo

[57] ABSTRACT

Polythioether polyols based on a major proportion of thiodiethanol and chain-extended by reaction with a diepoxide provide millable, sulfur-vulcanizable elastomeric compositions that provide, when vulcanized, good low temperature flexibility and low oil swell.

10 Claims, No Drawings

USE OF DIEPOXIDES IN POLYTHIODIETHANOL MILLABLE GUMS

CROSS-REFERENCE TO RELATED APPLICATIONS

This application is a continuation-in-part of application Ser. No. 534,544, filed Dec. 19, 1974, now abandoned.

This invention relates to millable, sulfur-vulcanizable elastomeric compositions comprising certain chain-extended polythioether polyols. More particularly, this invention relates to such elastomeric compositions wherein the polythioether polyol is based on a major proportion of thiodiethanol, a minor proportion of a diol furnishing external unsaturation, and, optionally, other diols, the polythioether polyol being chain-extended by reaction with a diepoxide to improve its processability on rubber mills.

Thiodiethanol exhibits unusual reactivity because of the positioning of its hydroxyl groups at the betapositions with respect to the sulfur atom in the aliphatic chain. Thus, unlike conventional aliphatic diols, it will undergo autocondensation in the presence of certain acidic catalysts to provide polymeric materials. Within certain limits and under certain conditions, thiodiethanol will condense with one or more aliphatic diols to give rubbery polymers. Such polymers are described in commonly assigned, copending application, Ser. No. 507,031, filed Sept. 18, 1974, the full disclosure of which is hereby incorporated herein by reference to avoid unnecessary redundancy.

Thiodiethanol will also undergo condensation with one or more aromatic dihydroxy compounds, or with a mixture of one or more aromatic dihydroxy compounds and one or more aliphatic diols, to provide sulfur-vulcanizable elastomeric compositions. Such compositions are described in commonly assigned, copending application Ser. No. 507,025, filed Sept. 18, 1974, the full disclosure of which is also hereby incorporated herein by reference to avoid unnecessary redundancy.

It is well-known that the Mooney value of an elastomeric composition is indicative of its processability on rubber mills. The Mooney value of a natural rubber, for example, is high due to naturally occurring cross-links. Natural rubber, with a Mooney value of about 60, must be broken down on the rubber mill before conventional compounding ingredients can be incorporated. Most synthetic elastomers have Mooney values in the range of about 15 to 50, and most elastomers having Mooney values of about 5 to 15 cannot be handled easily on a rubber mill. Depending in part on the chemical nature of the composition, is not always possible to provide an elastomer having a Mooney value above about 15. In addition, even some of those elastomers that have Mooney values above 15 could be improved in processability by increases in their Mooney value.

A problem that arises with respect to some of the aforementioned condensation polymers is that they are gums having low Mooney values. Thus, even though they are curable by conventional sulfur vulcanization techniques, they are difficult to process on rubber mills. Thus, although such polymers have desirable properties for use in vulcanized rubber applications, the difficulties of processing such polymers tends to limit their use.

The provision of polymers of the type described, modified so as to have the necessary Mooney value to be acceptably processable, would constitute a notable advance in the art and promote utilization of such polymers in vulcanized rubber applications.

In accordance with the present invention, there is provided a millable, sulfur-vulcanizable elastomeric composition comprising a copolymer represented by a polymer chain of the formula:

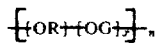

wherein R represents a radical derived from a diepoxide, or mixture of diepoxides, by cleavage on one bond on each oxygenation of the diepoxide, the cleavage being the result of reaction of the diepoxide with the terminal hydroxyl groups of a polythioether polyol represented by the formula

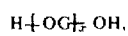

wherein

comprises randomly alternating units of (I) 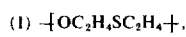

(II) 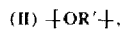

(III) 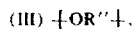

and (IV) [OR''']

wherein R' represents a radical remaining on removal of both hydroxyl groups from an aliphatic diol or mixture of aliphtic diols, R'' is an aromatic radical remaining on removal of both hydroxyl groups from an aromatic dihydroxy compound or mixture of aromatic dihydroxy compounds, R''' is the radical remaining on removal of both hydroxy groups of an aliphtic diol that provides an allylic double bond external to said polymer chain, wherein the mole ratio of structural units (I) to the total of units (II), (III), and (IV) is greater than 1:1 and the content of structural units (IV) is about 1 to 10 mole percent of the total mole content of

and wherein units (II) and (III) are optional and wherein X is a number such that the Mooney value of said polythioether polyol is less than about 20 and n is an integer such that the Mooney value of said copolymer is substantially higher than the Mooney value of said polythioether polyol. In preferred instances the Mooney value of the copolymer will be in excess of about 30.

The elastomeric compositions of the present invention are readily processed on conventional rubber mills and, when subsequently cured by conventional techniques, produce useful elastomers.

The copolymers of the present invention result from chain-extending a polythioether polyol with a diepoxide, such chain-extension providing an increase in Mooney value so as to impart desirable processability on rubber mills to the resulting copolymer.

In preparing the polythioether polyol for use in the present invention, two essential ingredients are involved, thiodiethanol and an aliphatic diol containing an allylic double bond external to the polymer chain. In addition to these essential ingredients, use can also be made of one or more aliphatic diols, one or more aromatic dihydroxy compounds, or a combination of one or more aromatic dihydroxy compounds and aliphatic diols.

Thiodiethanol, $HOCH_2CH_2—S—CH_2CH_2OH$, is the major ingredient of the polyether polyol and will constitute at least 50 mole percent of the total molar content of the polythioether polyol. This diol furnishes the (I) $—OCH_2CH_2SCH_2CH_2—$, structural units of the polythioether polyol. When the aliphatic diol furnishing allylic unsaturation as defined is the only other ingredient of the polythioether polyol, thiodiethanol will furnish from 90 to 99 mole percent of the structural units of the polythioether polyol. It is generally preferred that another diol, or dihydroxy compound, also be present with thiodiethanol and the unsaturated diol within the range states, but this is optional.

As indicated, one or more aliphatic diols may also be employed in preparing the polythioether polyol, such content being from 0 to about 49 percent, based on the total mole percent of structural units of the polythioether polyol. Suitable aliphatic diols include compounds in which the entire structure is aliphatic or cycloaliphatic as well as compounds in which mixed aromatic and aliphatic structures are involved so long as the hydroxyl groups are linked directly with the aliphatic structure. Suitable aliphatic structure. Suitable aliphatic diols, as defined immediately above, include but are not limited to ethylene glycol, propane -1,2-diol, propane -1,3-diol, butane -1,4-diol, pentane -1,5-diol, hexane -1,6-diol, diethylene glycol, cyclohexane -1,4-diol, cyclohexane -1,1-dimethanol, cyclohexane -1,3-dimethanol, cyclohexane -1,4-dimethanol, bis-ethers of dihydroxy aromatic compounds such as bis(hydroxyethoxy)hydroquinone or bis(hydroxyethoxy) resorcinol, and the like.

As also indicated, one or more aromatic dihydroxy compounds may be employed in place of or in conjunction with one or more aliphatic diols, such content being from 0 to about 49 mole percent, based on he total mole percent of structural units of the polythioether polyol. Suitable aromatic dihydroxy compounds include compounds containing two hydroxyl groups each of which is attached to an aromatic ring, not necessarily the same aromatic ring, and thus contain two phenol groups. Aromatic compounds that have the hydroxyl groups attached to side chains pendant from the aromatic ring or rings are, for the purpose of the present invention considered aliphatic diols, as defined above. Useful aromatic dihydroxy compounds according to the above definition include 4,4'-dihydroxybenzophenone, 4,4'-isopropylidenebisphenol, 4,4'-sulfonyldiphenol; hydroquinone, resorcinol, 1,4-naphthalene diol, 2,6-naphthalene diol, 1,6-naphthalene diol, 1,8-naphthalene diol, p,p'-biphenol, o,o'-biphenol, and the like.

The expression "allylic unsaturation external to the polymer chain" denotes the chemical structure $—CH—CH=CH—$ incorporated into the polymer in a manner such that it is possible to pass from one end of the main polymer chain to the other without traversing the allylic structure. The structure may thus be pendant to the main chain or may be included in an alicyclic ring. Aliphatic diols that contain allylic unsaturation that will be external to the polymer chain upon condensation of said diol include 3-cyclohexene-1,1-dimethanol, monoallyl ether of trimethylol propane, monoallyl ether of glycerol, and the like.

The various ingredients, essential and optional, to be used in preparing the polythioether polyol in the proportions specified, are reacted together in the presence of an acidic catalyst having a pK of 5 or less, usually at an elevated temperature, in accordance with conventional procedures. The preferred catalyst is phosphorous acid. Other useful acids include hydrochloric acid, sulfuric acid, sulfamic acid, picric acid, trialkyl phosphites, p-toluene-sulfonic acid, phosphoric acid, and the like. It is to be noted that certain of the catalytic acids can give rise to undesirable side reactions such as formation of odoriferous thioxane or dithiane, and where this is objectionable such catalytic acids should be avoided. Effective catalysis is usually achieved using from about 0.01 to 3 weight percent of acid based on the weight of the reactants, preferably 0.1 to 1.0 weight percent, same basis. Although higher amounts of acid may be used, no advantage has been found to arise from such use.

The chain-extending reaction is carried out by mixing sufficient of a diepoxide therewith and effecting reaction at a moderately elevated temperature, preferably at about 120 to 180° C. The reaction is carried out so as to produce a chain-extended polythioether polyol of substantially increased Mooney value which either imparts processability on rubber mills to an otherwise unprocessable polyether polyol or provides an improvement with respect to processability.

As employed herein, the term "diepoxide" means any compound containing two epoxy groups. Useful diepoxides include: diglycidyl ether; 1,2,3,4-diepoxybutaine; 1,2,7,8-diepoxyoctane; 1,2,5,6-diepoxycyclooctane; dicylopentadiene diepoxide; the diglycidyl ethers of such compounds as 1,3-propanediol, 1,4-butanediol, 1,6-hexandiol, cyclohexane-1,4-diol, cyclohexane-1,1-dimethanol, cyclohexane-1,2-dimethanol, cyclohexane-1,3-dimethanol, cyclohexane-1,4-dimethanol, diethylene glycol, hydroquinone, resorcinol, 4,4-isopropylidenebisphenol, naphthalene diols, and the like.

the amount of diepoxide that is to be used in any given instance to provide the necessary chain extension cannot be precisely stated. This is because such usage varies depending upon the polythioether polyol to be chain extended and the diepoxide selected for use. In any case, the amount of diepoxide to be used will be that amount that provides the desired increase in processability on rubber mills as reflected by Mooney values. Generally an effective amount of diepoxide is found in the range of about 0.05 to 5.0 weight percent based on the weight of the polyester polyol to be chain extended.

The polythioether polyols that are to be chain extended are, in general, those whose processability on rubber mills would benefit by such chain extension. Generally, any polythioether polyol that has a Mooney value below about 20 can benefit to some extent by chain extension to increase its Mooney value substantially above its initial value. In preferred instances, polythioether polyols having Mooney values of about 20 and below are advantageously chain-extended to Mooney values of about 30 and above.

The term "Mooney value", sometimes called "Mooney viscosity", is a standard expression in the rubber compounding art. It is defined by the procedure described in ASTM Method D 1646-72, with measurement at 212° F. using the large rotor described in the procedure. The rubber sample is inserted between the rotor and the die, heated for one minute, the rotor turned on for four minutes, and the viscosity (in Mooney units) is then read.

In general, increasing the molecular weight of a polymer will also increase its Mooney value. In the copolymer

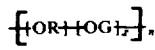

increasing either $x$ or $n$ will increase the total molecular weight and hence the Mooney value. All that is necessary for an understanding of the present invention is that the Mooney value of the copolymer is substantially higher than the Mooney value of the polythioether polyol, the increase arising due to the combination of subscripts $x$ and $n$ as opposed to the subscript $x$ alone.

It is to be noted that the Mooney value of the polymer compositions of the present invention may additionally be increased by the incorporation of small amounts of cross-linking, without departing from the scope of the invention. Such cross-linking is optional, and may be obtained by incorporating minor amounts of polyfunctional component in the polymer composition, for example, a triol, such as trimethylolpropane.

Particularly preferred embodiments of this invention are sulfur vulcanizable polythioether polyols derived from thiodiethanol and an unsaturated aliphatic diol, with or without 4,4'-isopropylidenebisphenol, chain-extended with about 0.1 percent to about 2 percent of the diglycidyl ether of 4,4'-isopropylidenebisphenol on the weight of the polythioether polyol.

The millable gums of this invention may be compounded on standard rubber processing equipment with conventional compounding ingredients, such as carbon black or other pigments and fillers, vulcanizing agents such as accelerators and sulfur, promotors such as zinc oxide, lubricants and mold release agents, antioxidants, plasticizers and the like, and compression molded into useful elastomeric products.

Preparation of and the effectiveness of the compositions employed in the present invention are further demonstrated in the examples below which are not to be taken as being limitative of the present invention. Unless otherwise indicated, all parts and percentages employed herein are by weight.

EXAMPLE 1

A. Preparation of Polythioether Polyol

In a suitable glass vessel, a mixture of 59.85 grams, 0.49 mole, of thiodiethanol, 7.0 grams, 0.03 mole, or 4,4'-isopropylidenebisphenol, 3.15 grams, 0.022 mole, of 3-cyclohexane-1,1-dimethanol, and 0.56 gram of phosphorus acid, is heated for 1 hour in a 215° C. oil bath under a nitrogen atmosphere. Vacuum is then applied reducing the internal pressure gradually from 760 mm to about 380 mm, then more slowly to about 7.5 mm and the temperature of the oil bath is reduced to 190°–200° C. After 2 hours the vessel is vented, and additional 0.14 gram of phosphorous acid is added to the reaction mixture and the reaction mixture is heated for 40 minutes at 190° C./7.5 mm. The total amount of phosphorous acid is added represents 1.0 percent on the weight of the reactants used.

The vessel is vented, and the resulting polythioether polyol is recovered. The product is a gum so soft that it cannot be processed on a rubber mill.

B. Chain Extension of Polythioether Polyol

To the product of Part A is added 1.4 grams, 0.004 mole, of the diglycidyl ether of 4,4'-isopropylidenebisphenol, 2 percent on the weight of the reactants used, and the reaction mixture is heated under vacuum at 190° C. at 7.5 mm of mercury to chain-extend the copolymer. The chain-extended polythioether polyol is a millable gum having a Mooney value of 23 at 100° C.

EXAMPLE 2

A. Preparation of Polythioether Polyol

In a conical mixer reactor a mixture of 85.0 grams, 0.690 mole, of thiodiethanol, 5.0 grams, 0.029 mole, of the monoallyl ether of 2-ethyl-2-(hydroxymethyl)-1,3-propanediol, 10.0 grams, 0.044 mole, of 4,4'-isopropylidenebisphenol, and 0.8 gram of phosphorous acid is heated for 1 hour in a 215° C. oil bath under a nitrogen atmosphere. Vacuum is then applied reducing the internal pressure stepwise from 760 mm to about 380 mm, then more slowly to about 7.5 mm and the temperature of the oil bath is reduced to 200° C. and maintained at 200° C. for 2 hours and 40 minutes. The reactor is then coded and vented.

B. Chain Extension of Polythioether Polyol

To the polythioether polyol of part A is added 0.35 gram, 0.001 mole, of the diglycidyl ether of 4,4'-isopropylidenebisphenol, 0.35 percent on the weight of the reactants used, and the reaction mixture is heated for 2 hours at 190° C/7.5 mm to chain-extend the polythioether polyol. The chain-extended polythioether polyol is a millable gum having a Mooney value of 25 at 100° C.

EXAMPLE 3

A. Preparation of Polythioether Polyol

The procedure of Example 2, Part A, is followed except that the amounts used are 90.0 grams, 0.737 mole, of thiodiethanol, 5.0 grams, 0.029 mole of the monoallyl ether of 2-ethyl-2-(hydroxymethyl)-1,3-propanediol, 5.0 grams, 0.022 mole of 4,4'-isopropylidenebisphenol, and 0.8 gram of phosphorous acid.

B. Chain Extension of Polythioether Polyol

The reactor is vented and to the resulting polythioether polyol is added 0.50 gram, 0.0025 mole, of the diglycidyl ether of 1,4-butanediol, 0.5 percent on the weight of the original reactants, and the reaction mixture is heated for 2 hours at 190° C/7.5 mm. The chain-extended polythioether polyol has a Mooney value of 22 at 100° C.

EXAMPLE 4

100 grams of the gum of Example 2, Part B, is compounded on a standard 2-roll rubber mill as follows:

|  | Parts |
|---|---|
| Gum | 100 |
| Carbon black | 60 |
| Calcium carbonate | 4 |
| Calcium hydroxide | 3 |
| Zinc oxide | 5 |

-continued

| | Parts |
|---|---|
| Sulfur | 1 |
| 2-mercaptobenzothiazole | 1.5 |
| Tetramethylthiuram disulfide | 1.5 |

The compound gum is compression moulded for 30 minutes at 150° C. and post-cured in an oven for 16 hours at 120° C. The cured elastomer has the following stress-strain properties:

| | |
|---|---|
| Hardness, Shore A | 70 |
| Modulus at 100%, psi | 610 |
| Tensile strength, psi | 1600 |
| Elongation, % | 240 |

The cured sample has an oil swell of 9 percent after 70 hours in No. 3 oil at 100° C., and a low temperature flexibility of −52° C.

EXAMPLE 5

A. Preparation of Polythioether Polyol

To a suitable glass vessel are added 465.0 grams, 3.81 moles, of thiodiethanol, and 35.0 grams, 0.20 mole, of the monoallyl ether of 2-ethyl-2-(hydroxymethyl)-1,3-propanediol. The mixture is purged with nitrogen for 15 minutes while stirring and then heated. When the temperature reaches 80° C., 5.0 grams of phosphorous acid is added and the reaction mixture is heated to 192° C. The vessel is then placed under vacuum while bleeding nitrogen through the system and heating is continued to collect about 110 ml. of distillate. The vacuum is then broken with mitrogen and the syrupy product is stored under nitrogen. The product was unsuitable for processing on a rubber mill.

B. Chain Extension of Polythioether Polyol

An aliquot of 214.0 grams of the product of Part A is placed in a suitable reaction vessel and purged with nitrogen while stirring for about 10 minutes. The material is then heated under a vacuum of 6–7 mm if mercury at 190°–195° C. for a period of about 2½ hours while stirring slowly. To the reaction mixture is added 2.1 grams of the diglycidyl ether of 4,4′-isopropylidenebisphenol, 1 percent on the weight of the polythioether polyol, and stirring is continued under a vacuum of 6–7 mm of mercury at 190°–192° C. for 2 hours to chain-extend the polythioether polyol. The reaction mixture is then cooled to room temperature and the vacuum is broken. The product has a Mooney value of 49 at 100° C.

EXAMPLE 6

A. Preparation of Polythioether Polyol

The procedure of Example 5, Part A, is followed except that 1425.0 grams, 11.67 moles, of thiodiethanol is reacted with 75.0 grams, 0.52 mole, of 3-cyclohexene-1,1-dimethanol, in the presence of 15.0 grams of phosphorous acid until 355 mil. of distillate is collected. The reaction mixture is then cooled to room temperature and the vacuum is broken. The product is too soft to process on a rubber mill.

B. Chain Extension of Polythioether Polyol

An aliquot of 50.0 grams of the product of Part A is heated under nitrogen at 190°–195° C. under vacuum for 15 minutes. To the mixture is then added 1.0 gram of the diglycidyl ether of 4,4′-isopropylidenebisphenol, 2 percent on the weight of the polythioether polyol, and heating is continued for 7 hours. The reaction mixture is cooled to room temperature to obtain a millable product.

EXAMPLE 7

The procedure of Example 1, Part B, is used except that 1.4 grams, 0.011 mole, of diglycidly ether, 2 percent on the weight of the original reactants, is used to chain-extend the polythioether polyol. The chain-extended polythioether polyol is a millable gum.

EXAMPLE 8

The procedure of Example 1, Part B, is used except that 1.4 grams, 0.016 mole, of butanediepoxide, 2 percent on the weight of the original reactants, is used to chair-extend the polythioether polyol. The resulting product is a millable gum.

EXAMPLE 9

The procedure of Example 1, Part B, is used except that 1.4 grams, 0.9985 mole, of dicyclopentadiene diepoxide, 2 percent on the weight of the original reactants is used for chain-extension. the product is a millable gum.

EXAMPLE 10

The procedure of Example 5, Part B, is used except that 2.1 grams, 0.016 mole, of diglycidyl ether, 2 percent on the weight of the polythioether polyol is used to chain-extend the polythioether polyol. The chain-extended polythioether polyol is a millable gum.

EXAMPLE 11

The procedure of Example 5, Part B, is used except that 2.1 grams, 0.024 mole, of butane diepoxide, 2 percent on the weight of the polythioether polyol, is used to chain-extend the polythioether polyol. The chain-extended polythioether polyol is a millable gum.

EXAMPLE 12

The procedure of Example 5, Part B, is used except that 2.1 grams, 0.013 mole, of dicyclopentadiene diepoxide, 2 percent on the weight of the polythioether polyol, is used to chain-extend the polythioether polyol. The chain-extended polythioether polyol is a millable gum.

EXAMPLE 13

The procedure of Example 6, Part B, is used except that 1.0 gram, 0.011 mole, of butane diepoxide, 2 percent on the weight of the polythioether polyol, is used to chain-extend the polythioether polyol. The chain-extended polythioether polyol is a millable gum.

EXAMPLE 14

The procedure of Example 6, Part B, is used except that 1.0 gram, 0.006 mole, of dicyclopentadiene diepoxide, 2 percent on the weight of the polythioether polyol, is used to chain-extend the polythioether polyol. The chain-extended polythioether polyol is a millable gum.

I claim:

1. A millable, sulfur-vulcanizable elastomer composition comprising a copolymer represented by a polymer chain of the formula:

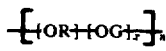

wherein R represents a radical derived from a 1,2 diepoxide; or a mixture of 1,2 diepoxides, by cleavage of one bond on each oxygen atom of the diepoxide, said cleavage resulting from reaction of the diepoxide with the terminal hydroxyl groups of a polythioether polyol represented by the formula $H\text{-}[OG]_x OH$, wherein $\text{-}[OG]\text{-}$ comprises randomly alternating units of (I) $\text{-}[OC_2H_4SC_2H_4]\text{-}$, (II) $\text{-}[OR']\text{-}$, (III) $\text{-}[OR'']\text{-}$, and (IV) $\text{-}[OR''']\text{-}$, wherein R' represents a radical remaining on removal of both hydroxyl groups from an aliphatic diol or mixture of aliphatic diols, R'' is an aromatic radical remaining on removal of both hydroxyl groups from an aromatic dihydroxy compound, or mixture of aromatic dihydroxy compounds, R''' is the radical remaining on removal of both hydroxyl groups of an aliphatic diol that provides allylic unsaturation that is external to said polymer chain, wherein the mole ratio of structural units (I) to the total of units (II), (III), and (IV) is greater than 1:1, said structures (II) and (III) being optional, and the content of structural units (IV) is about 1 to 10 mole percent of the total mole content of [OG]; and wherein x is an integer such that the Mooney value of said polythioether polyol is less than about 20 and n is an integer such that the Mooney value of said copolymer is substantially higher than the Mooney value of said polythioether polyol.

2. The composition of claim 1 wherein x is an integer such that the Mooney value of said polyether polyol is less than about 20 and n is an integer such that the Mooney value of said copolymer is above about 30.

3. The composition of claim 1 wherein R is the radical derived from a diepoxide selected from the group consisting of diglycidyl ether, butane diepoxide, the diglycidyl ether of 4,4'-isopropylidenebisphenol, and dicyclopentadiene diepoxide with an aliphatic or aromatic hydroxyl group.

4. The composition of claim 1 wherein said polythioether polyol contains structural units of (I) and (IV).

5. The composition of claim 1 wherein said polythioether polyol contains structural units of (I) (III) and, (IV).

6. The composition of claim 3 wherein said polythioether polyol contains structural units of (I) and (IV).

7. The composition of claim 3 wherein said polythioether polyol contains structural units of (I), (III), and (IV).

8. The composition of claim 7 wherein R'' is the radical remaining after the removal of both hydroxyl groups from 4,4'-isopropylidenebisphenol.

9. The composition of claim 3 wherein R is the radical derived from the diglycidyl ether of 4,4'-isopropylidenebisphenol.

10. The composition of claim 9 wherein R'' is the radical remaining after the removal of both hydroxyl groups from 4,4'-isopropylidenebisphenol.

* * * * *